United States Patent
Kobayashi et al.

(10) Patent No.: US 6,827,257 B2
(45) Date of Patent: Dec. 7, 2004

(54) METHOD AND APPARATUS FOR RECORDING CONTENT CONTAINING WATERMARK

(75) Inventors: Tadashi Kobayashi, Chiba (JP); Hideo Ando, Hino (JP); Tomoo Yamakage, Yokohama (JP); Hisashi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/102,712

(22) Filed: Mar. 22, 2002

(65) Prior Publication Data

US 2003/0098345 A1 May 29, 2003

(30) Foreign Application Priority Data

Nov. 29, 2001 (JP) ........................................ 2001-364812

(51) Int. Cl.⁷ .............................. G06F 17/00; G06K 9/00
(52) U.S. Cl. ...................................... 235/375; 382/100
(58) Field of Search ...................... 382/100; 235/375; 713/176; 386/94

(56) References Cited

U.S. PATENT DOCUMENTS

| | | | | |
|---|---|---|---|---|
| 6,332,194 B1 | * | 12/2001 | Bloom et al. | 713/176 |
| 6,374,036 B1 | * | 4/2002 | Ryan et al. | 386/94 |
| 6,434,322 B1 | * | 8/2002 | Kimura et al. | 386/94 |
| 6,523,113 B1 | * | 2/2003 | Wehrenberg | 713/176 |
| 6,553,129 B1 | * | 4/2003 | Rhoads | 382/100 |
| 6,563,937 B1 | * | 5/2003 | Wendt | 382/100 |
| 2002/0114459 A1 | * | 8/2002 | Belenko et al. | 380/201 |
| 2002/0126996 A1 | * | 9/2002 | Kuroda | 386/94 |
| 2003/0009669 A1 | * | 1/2003 | White et al. | 713/176 |
| 2003/0128860 A1 | * | 7/2003 | Braudaway et al. | 382/100 |

FOREIGN PATENT DOCUMENTS

| | | |
|---|---|---|
| JP | 2000-48481 | 2/2000 |
| JP | 2000-49616 | 2/2000 |
| JP | 2000-149413 | 5/2000 |
| JP | 2000-163871 | 6/2000 |
| JP | 2000-182324 | 6/2000 |
| JP | 2001-60340 | 3/2001 |
| WO | 02/11140 | 2/2002 |

* cited by examiner

*Primary Examiner*—Daniel A. Hess
(74) *Attorney, Agent, or Firm*—Oblon, Spivak, McClelland, Maier & Neustadt, P.C.

(57) ABSTRACT

A recording apparatus includes a generation section configured to embed a new watermark in an original content containing an original watermark to generate a new content, and a recording section configured to record the new content.

6 Claims, 7 Drawing Sheets

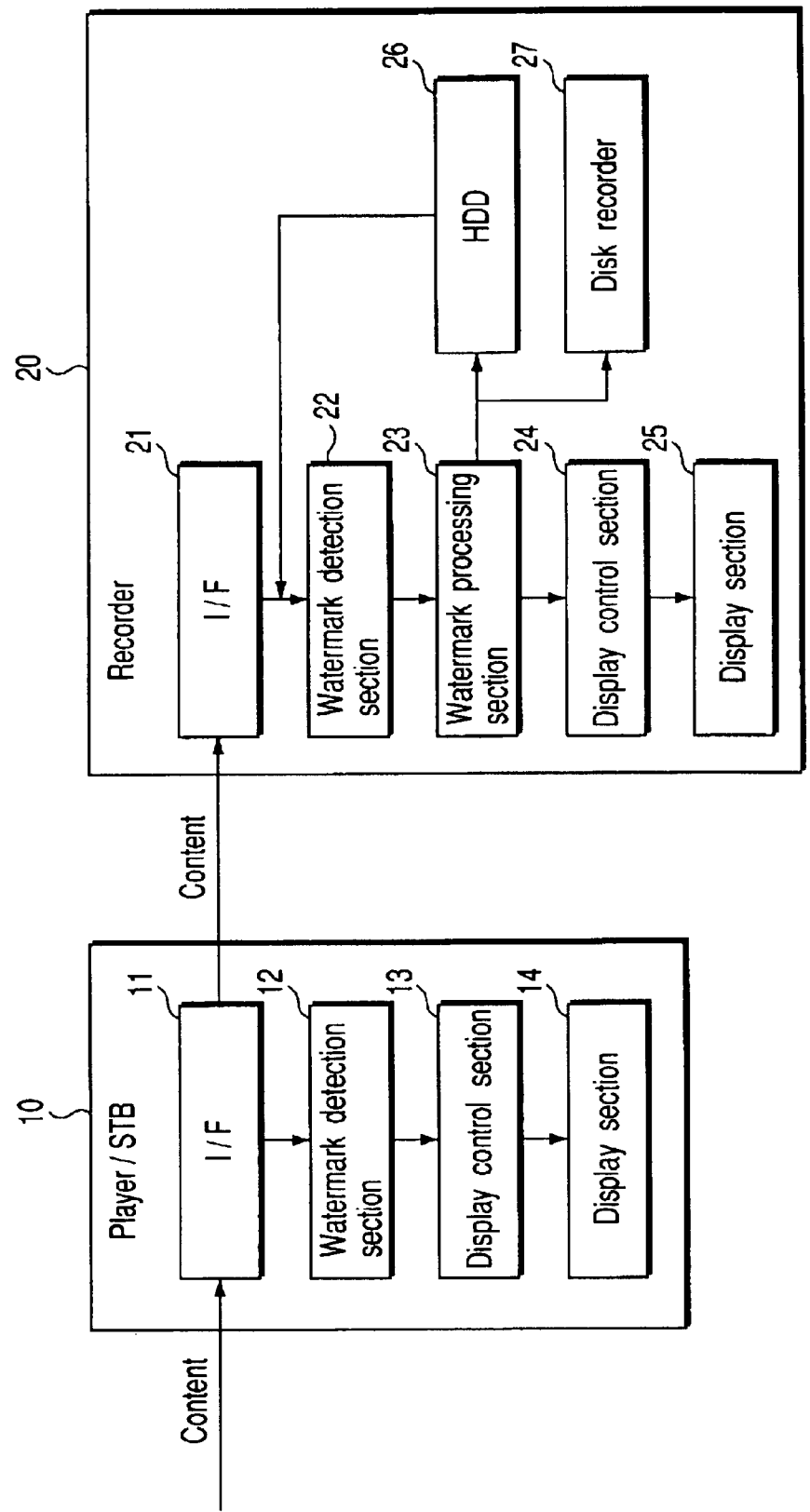
F I G. 1

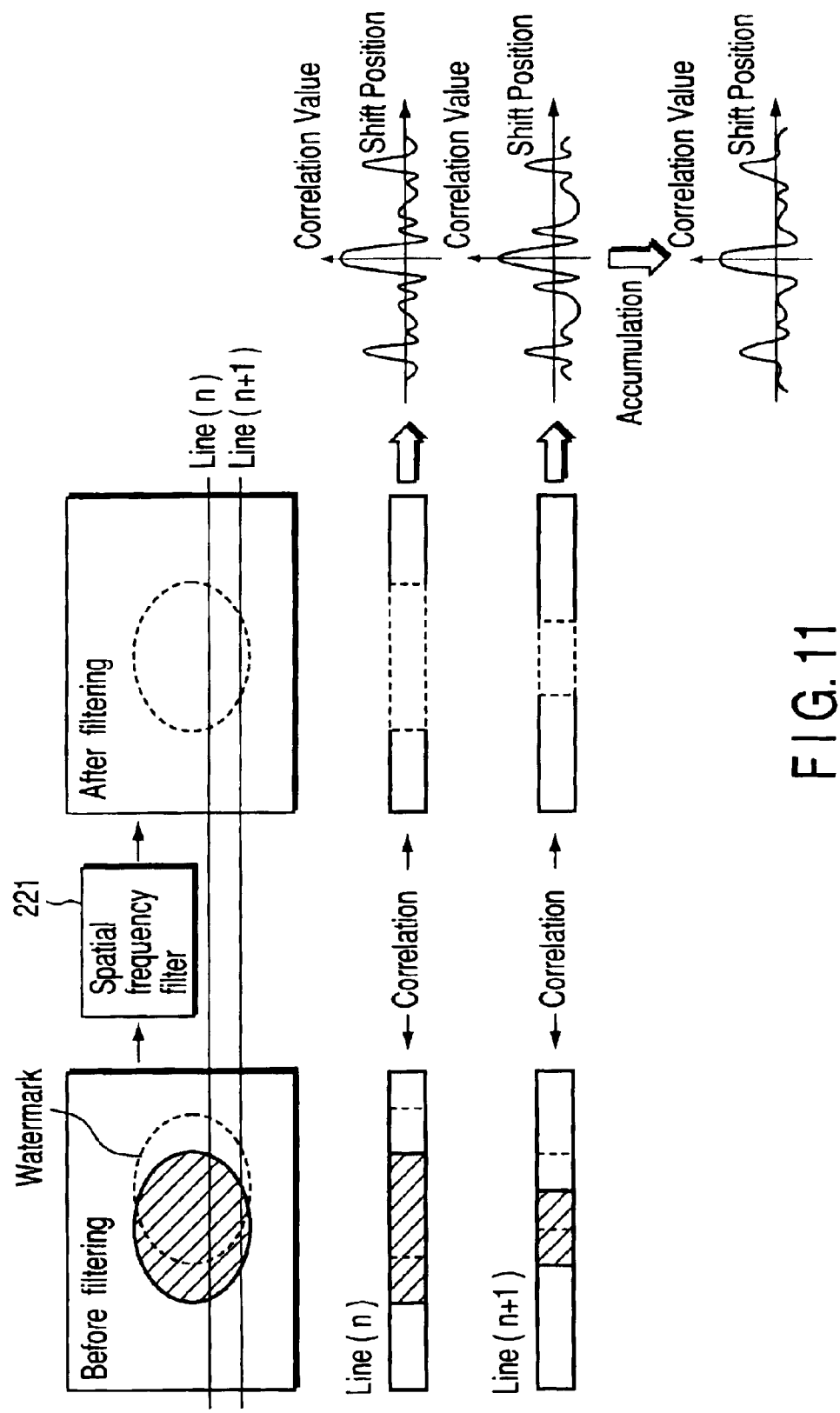
F I G. 11

METHOD AND APPARATUS FOR RECORDING CONTENT CONTAINING WATERMARK

CROSS-REFERENCE TO RELATED APPLICATIONS

This application is based upon and claims the benefit of priority from the prior Japanese Patent Application No. 2001-364812, filed Nov. 29, 2001, the entire contents of which are incorporated herein by reference.

BACKGROUND OF THE INVENTION

1. Field of the Invention

The present invention relates to a method and apparatus for recording a content containing a watermark.

2. Description of the Related Art

In recent years, a recording apparatus for receiving a digital content through, e.g., satellite broadcast and recording it on an optical disk has been researched and developed. A watermark is embedded in the digital content to protect the copyright.

Techniques related to watermarks are disclosed in Jpn. Pat. Appln. KOKAI Publication Nos. 2001-60340, 2000-48481, and 2000-49616. However, the watermarks disclosed in these prior arts cannot cope with careless content copy by users and cannot sufficiently protect copyrights.

More specifically, general users can see no watermarks embedded in contents as signals. For this reason, if users are going to carelessly copy contents with watermarks embedded, they cannot know the reason why copy is impossible. In addition, watermarks embedded in contents provided from broadcast stations cannot sufficiently protect copyrights.

BRIEF SUMMARY OF THE INVENTION

It is an object of the present invention to provide a method and apparatus for recording a content containing a watermark, which are suitable for copyright protection.

In order to solve the above problems and achieve the above object, a method and apparatus for recording a watermark containing a watermark according to an embodiment of the present invention have the following arrangement.

(1) According to the embodiment of the present invention, there is provided an apparatus for recording a content containing a watermark, comprising a generation section configured to embed a new watermark (WM2) in an original content containing an original watermark (WM1) to generate a new content, and a recording section configured to record the new content.

(2) According to the embodiment of the present invention, there is provided a recording method of recording a content containing a watermark, comprising embedding a new watermark (WM2) in an original content containing an original watermark (WM1) to generate a new content, and recording the new content.

Additional objects and advantages of the present invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIG. 1 is a block diagram showing the schematic arrangement of a content recording/reproducing apparatus;

FIG. 11 is a view for explaining detection of a phase shift correction amount.

DETAILED DESCRIPTION OF THE INVENTION

Figure 2:
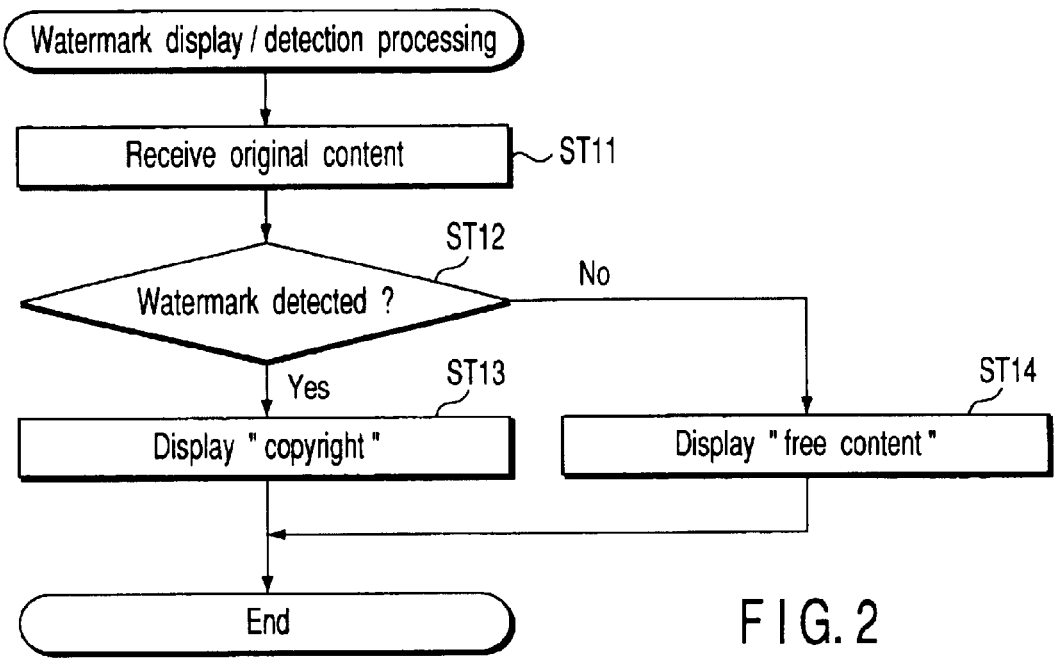
FIG. 2 is a flow chart for explaining watermark display/detection processing.

The embodiment of the present invention will be described below with reference to the accompanying drawing.

The representative characteristic features according to the embodiment of the present invention will be briefly described. A watermark (WM) is embedded in a content. This watermark contains copy control information. When the content is displayed, the copy control information is simultaneously or independently displayed for a user.

FIG. 1 is a block diagram showing the schematic arrangement of a content recording/reproducing apparatus. This content recording/reproducing apparatus is an example of the apparatus for recording a content containing a watermark of the present invention. As shown in FIG. 1, the content recording/reproducing apparatus has a player/STB (Set Top Box) 10 and recorder 20. The player/STB 10 has an interface (I/F) 11, watermark detection section 12, display control section 13, and display section 14. The recorder 20 has an interface (I/F) 21, watermark detection section 22, watermark processing section 23, display control section 24, display section 25, hard disk drive (HDD) 26, and disk recorder 27.

Processing in a content reproduction mode will be described with reference to the flow chart shown in FIG. 2. FIG. 2 is a flow chart for explaining watermark detection/display processing.

An original content provided by a satellite broadcast (BS) is received through the interface 11 of the player/STB 10 (ST11) and reproduced by the player/STB 10. If a watermark has been embedded in the original content, the watermark detection section 12 detects the watermark.

When the watermark detection section 12 detects a watermark from the original content (ST12, YES), a watermark detection notification is sent to the display control section 13. Upon receiving this notification, the display control section 13 causes the display section 14 to display information representing that the received content has a copyright. As an example of display, "copyright" is displayed on the display section 14 (ST13). The information representing that the content has a copyright is displayed at the same timing as that of content display or at a timing independently of content display. Alternatively, copy control information contained in the watermark may be decoded, and it may be indicated that copy is restricted, as needed.

When the watermark detection section 12 detects no watermark from the content (ST12, NO), watermark non-detection notification is sent to the display control section 13. Upon receiving this notification, the display control section 13 causes the display section 14 to display that the received content has no copyright. As an example of display, "free content" is displayed on the display section 14 (ST14). Alternatively, no message is displayed.

The display section 14 may be either a display unit (display window) incorporated in the player/STB 10 main body, as shown in FIG. 1, or a display unit such as a TV or CRT externally connected to the player/STB 10.

FIGS. 3 to 6 are views showing display contents displayed on the display section 14.

Figure 3:
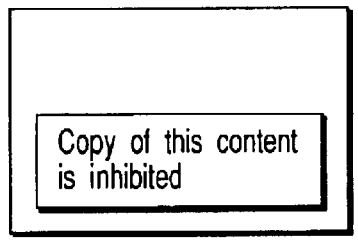
FIG. 3 is a view showing a window which indicates by characters that copy of a content is inhibited.

FIG. 3 shows an example in which a content is copyright-protected by a watermark embedded in it, and it is indicated by characters that copy of the content is inhibited.

Figure 4:
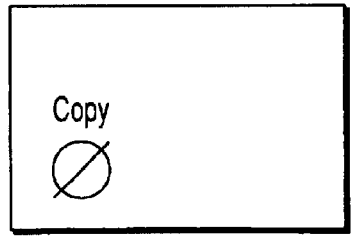
FIG. 4 is a view showing a window which indicates by a symbol that copy of a content is inhibited.

FIG. 4 shows an example in which a content is copyright-protected by a watermark embedded in it, and it is indicated by a symbol that copy of the content is inhibited.

Figure 5:
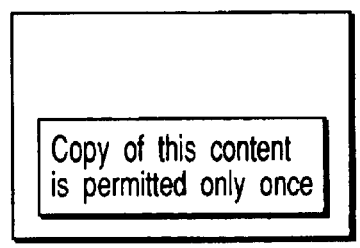
FIG. 5 is a view showing a window which indicates by characters that a content can be copied only once.

FIG. 5 shows an example in which a content is copyright-protected by a watermark embedded in it, and if copy of the content is permitted only once, it is indicated by characters that the content can be copied only once.

Figure 6:
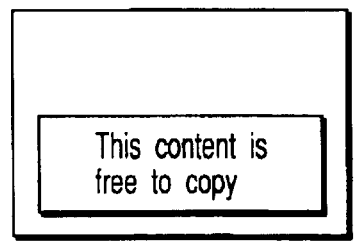
FIG. 6 is a view showing a window which indicates by characters that a content is free to copy.

FIG. 6 shows an example in which a content is not copyright-protected by a watermark embedded in it, and if copy of the content can be freely done, it is indicated by characters that the content is free to copy.

Figure 7:
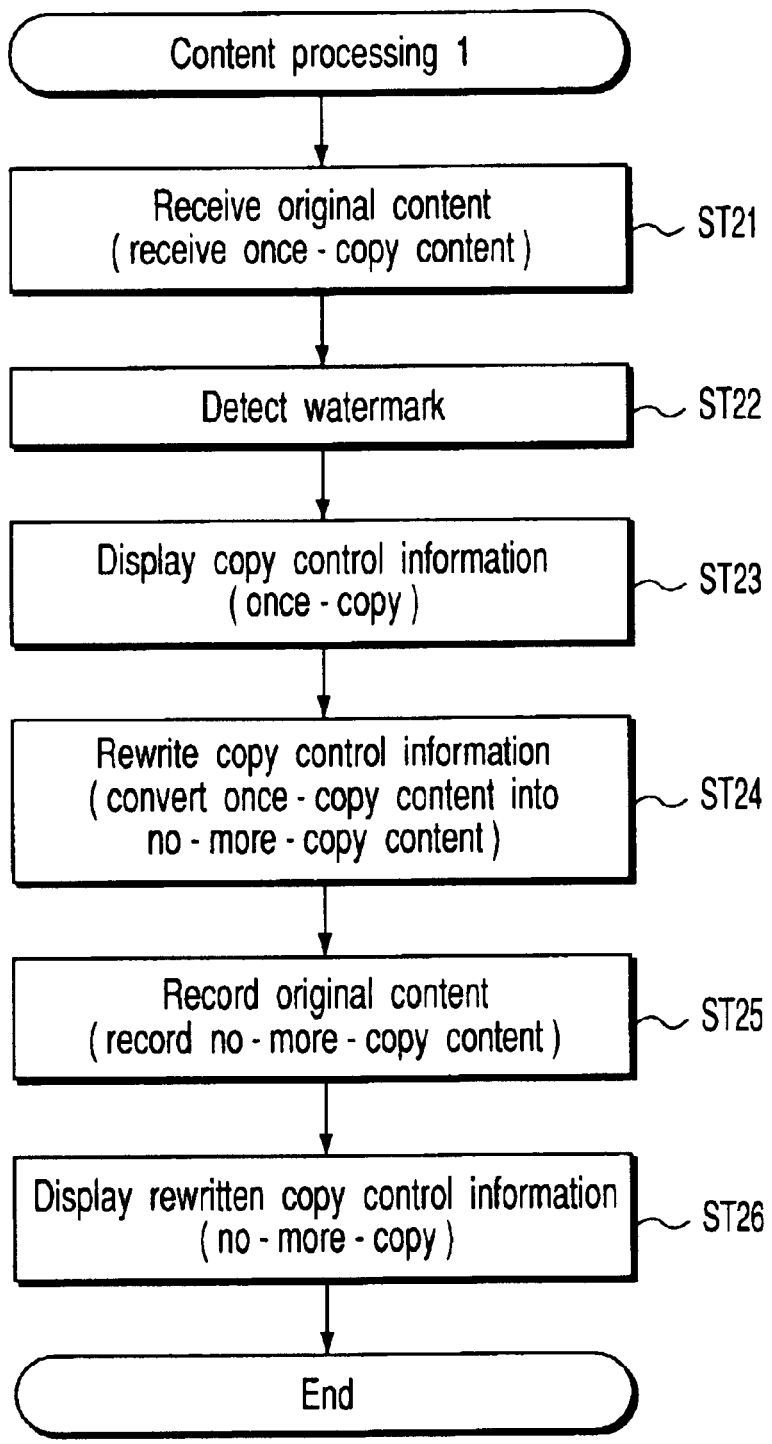
FIG. 7 is a flow chart for explaining content processing 1.

Copy processing 1 for an original content that can be copied only once will be described next with reference to FIG. 7. First, a once-copy content (=original content) is received through the interface 11 of the player/STB 10 (ST21). A watermark is embedded in the once-copy content. This watermark contains copy control information that allows copy only once. The watermark detection section 12 of the player/STB 10 detects the watermark embedded in the once-copy content (ST22). At this time, the display control section 13 instructs the display section 14 to display the copy control information contained in the detected watermark. The copy control information is displayed on the display section 14 (ST23). The displayed content is, e.g., "copy of this content is permitted only once".

To record the once-copy content, it is output from the interface 11 of the player/STB 10, input to the interface 21 of the recording processing section 20, and temporarily stored in the hard disk drive (HDD) 26. To record the once-copy content stored in the hard disk drive 26 on a recording medium such as an optical disk by the disk recorder 27, the watermark detection section 22 detects the watermark contained in the once-copy content. The watermark contained in the once-copy content contains the copy control information that allows copy only once. That is, with detection processing by the watermark detection section 22, the watermark is detected from the once-copy content. It also reveals that the watermark contains the copy control information that allows copy only once. At this time, the watermark processing section 23 rewrites the copy control information contained in the once-copy content. More specifically, the watermark processing section 23 rewrites the copy control information contained in the once-copy content, which allows copy only once, to copy control information that inhibits copy. A content containing copy control information that inhibits copy is called a no-more-copy content.

That is, the once-copy content (copy control information= once-copy) is converted into no-more-copy content (copy control information=no-more-copy) (ST24) and then recorded on a recording medium such as an optical disk by the disk recorder 27 (ST25). The content recorded on the recording medium cannot be recorded on another recording medium. In recording the no-more-copy content on the recording medium, the display section 25 displays the copy control information contained in the no-more-copy content (ST26). The displayed content is, e.g., "copy of this content is inhibited".

Figure 8:
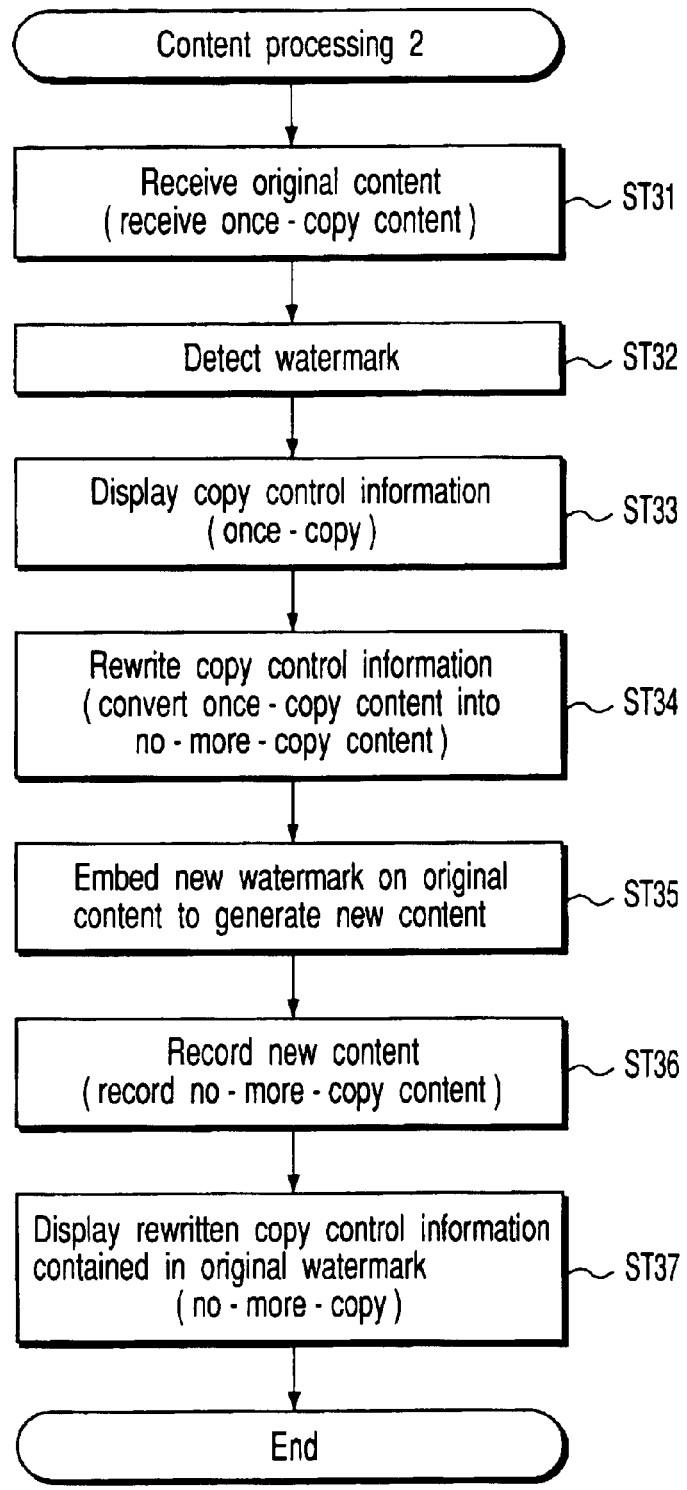
FIG. 8 is a flow chart for explaining content processing 2.

Copy processing 2 for an original content that can be copied only once will be described next with reference to FIG. 8. First, a once-copy content (=original content) is received through the interface 11 of the player/STB 10 (ST31). An original watermark (WM1) is embedded in the once-copy content. This original watermark contains copy control information that allows copy only once. The watermark detection section 12 of the player/STB 10 detects the watermark embedded in the original content (ST32). At this time, the display control section 13 instructs the display section 14 to display the copy control information contained in the detected original watermark. The copy control information is displayed on the display section 14 (ST33). The displayed content is, e.g., "copy of this content is permitted only once".

To record the once-copy content, it is output from the interface 11 of the player/STB 10, input to the interface 21 of the recording processing section 20, and temporarily stored in the hard disk drive (HDD) 26. To record the once-copy content stored in the hard disk drive 26 on a recording medium such as an optical disk by the disk recorder 27, the watermark detection section 22 detects the original watermark contained in the once-copy content. The original watermark contained in the once-copy content contains the copy control information that allows copy only once. That is, with detection processing by the watermark detection section 22, the original watermark is detected from the once-copy content. It also reveals that the original watermark contains the copy control information that allows copy only once. At this time, the watermark processing section 23 rewrites the copy control information contained in original watermark of the once-copy content. More specifically, the watermark processing section 23 rewrites the copy control information contained in the original watermark of the once-copy content, which allows copy only once, to copy control information that inhibits copy. A content containing copy control information that inhibits copy is called a no-more-copy content.

The watermark processing section 23 also embeds a new watermark (WM2) in the no-more-copy content in a form different from that of the original watermark. Copy control information contained in the new watermark is identical to that contained in the original watermark. In this case, both the copy control information contained in the original watermark and that contained in the new watermark inhibit copy.

That is, the once-copy content (copy control information contained in original watermark=once-copy) is converted into no-more-copy content (copy control information contained in original watermark=no-more-copy) (ST34). It is generated as a new content by embedding a new watermark (ST35) and recorded on a recording medium such as an optical disk by the disk recorder 27 (ST36). The new content recorded on the recording medium cannot be recorded on another recording medium because of the copy control information (=no-more-copy) contained in the original watermark and that (=no-more-copy) contained in the new watermark. Since copy is inhibited by doubled copy control information, the copyright is more firmly protected. In other words, content copyright protection can be done by the recording processing section 20.

In recording the new content on the recording medium, the display section 25 displays the copy control information contained in the original watermark of the new content (ST37). The displayed content is, e.g., "copy of this content is inhibited". However, the copy control information contained in the new watermark is not displayed.

Figure 9:
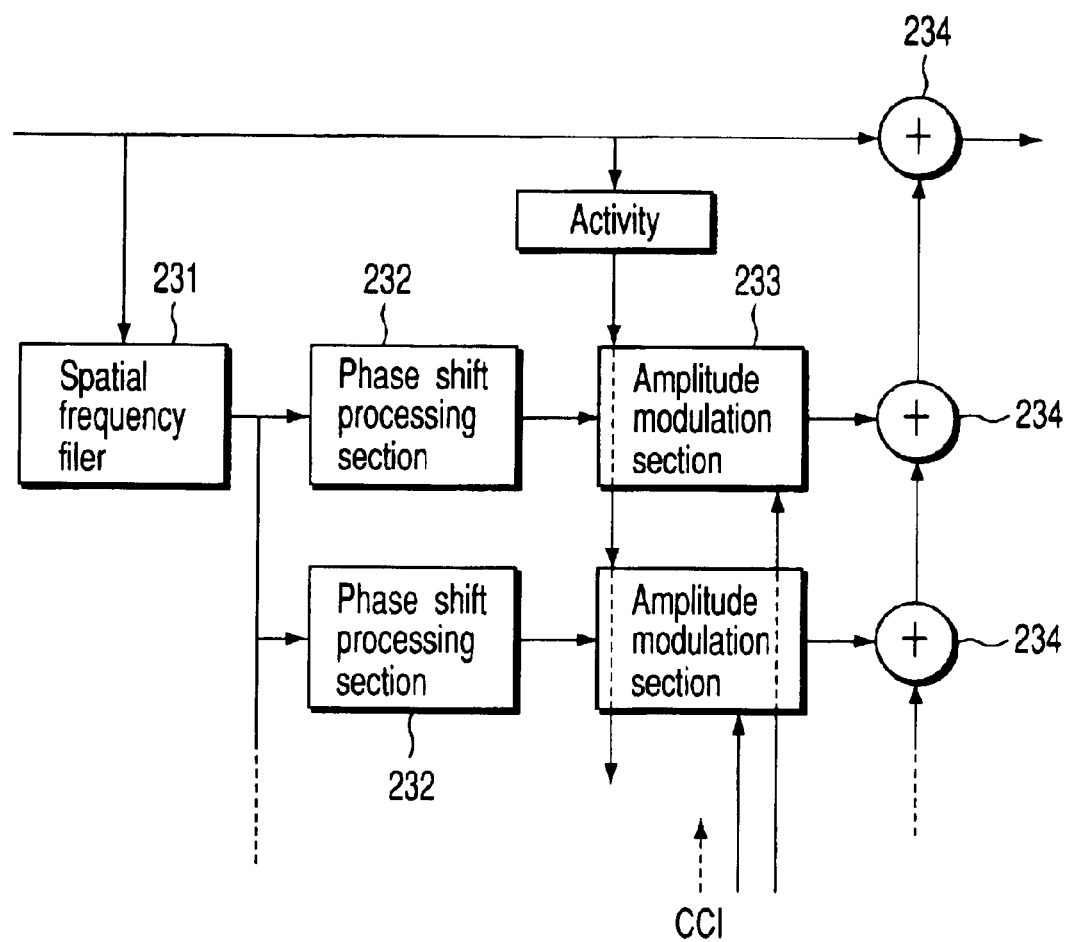
FIG. 9 is a block diagram showing the schematic arrangement of the new watermark embedding section in the watermark processing section.

New watermark embedding processing by the watermark processing section 23 will be described next with reference to FIG. 9. FIG. 9 is a block diagram showing the schematic arrangement of the new watermark embedding section in the watermark processing section 23. As shown in FIG. 9, the new watermark embedding section in the watermark processing section 23 has a spatial frequency filter 231 (SFF), phase shift processing sections 232, amplitude modulation sections 233, and adders 234.

The spatial frequency filter 231 extracts an electrical signal having a specific frequency component from an original content to be subjected to new watermark embedding processing. The phase shift processing section 232 appropriately phase-shifts the extracted electrical signal with the specific frequency component. The amplitude modulation section 233 adjusts the amplitude of the phase-shifted signal in correspondence with the signal amplitude of the original content. The adder 234 adds the amplitude-adjusted signal to the original content. With this processing, a new content can be generated by embedding a new watermark in an original content containing an original watermark.

The original watermark and new watermark have different forms because the phase shift directions are vertically and horizontally changed with respect to the screen. However, the present invention is not limited to the above-described phase shift directions, and any other watermark form can be applied. For example, the display screen may be divided into two parts such that an original watermark is embedded on the upper side of the screen, and a new watermark is embedded on the lower side of the screen.

Figure 10:
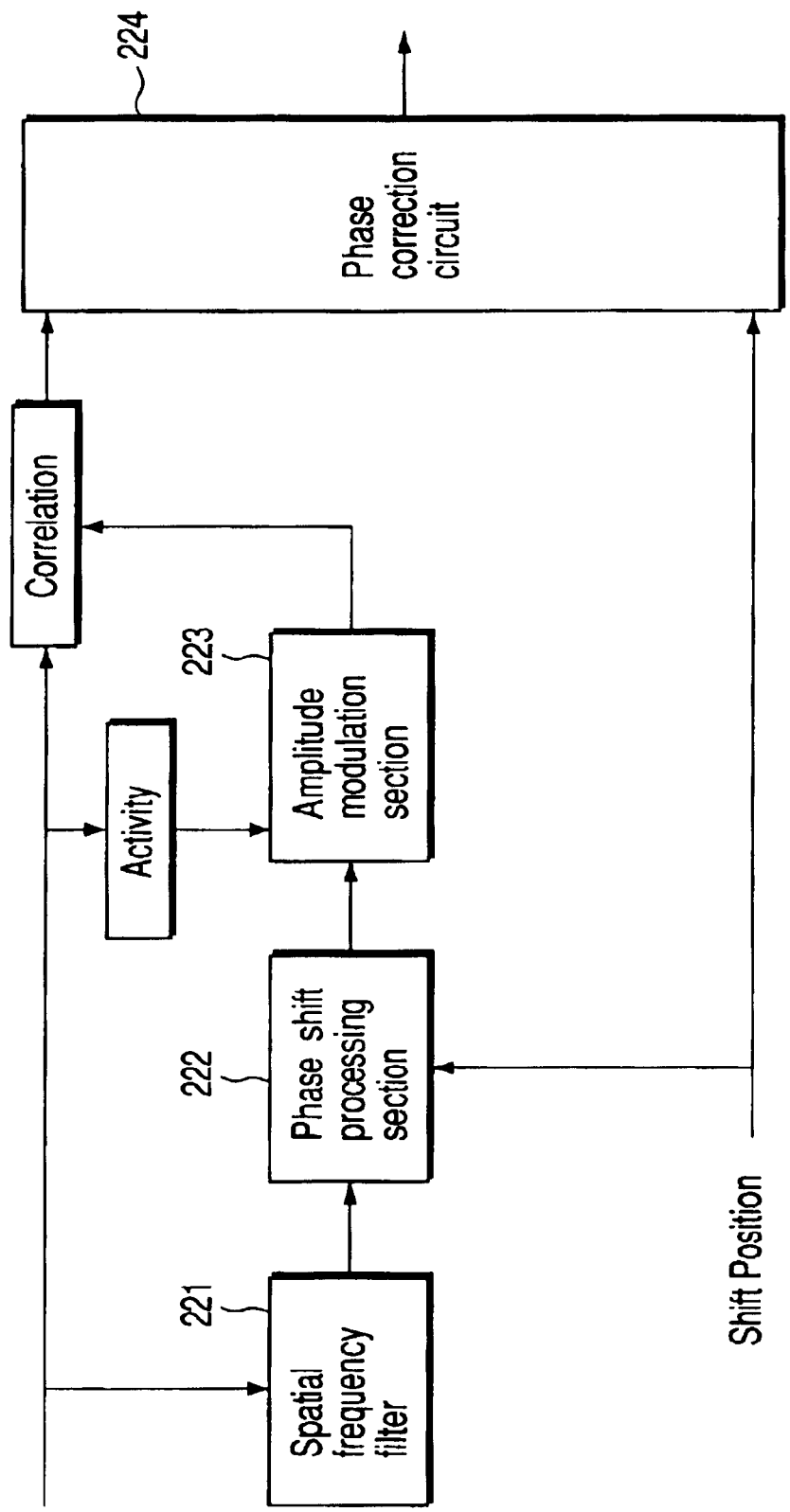
FIG. 10 is a block diagram showing the schematic arrangement of the watermark detection processing section in the watermark detection section.

Watermark detection processing by the watermark detection section 22 will be described next with reference to FIG. 10. FIG. 10 is a block diagram showing the schematic arrangement of the watermark detection processing section in the watermark detection section 22. As shown in FIG. 10, the watermark detection section in the watermark detection section 22 has a spatial frequency filter 221, phase shift processing section 222, amplitude modulation section 223, and phase correction circuit 224.

The spatial frequency filter 221 extracts an electrical signal having a specific frequency component from a content. The phase shift processing section 222 appropriately phase-shifts the extracted electrical signal with the specific frequency component. The amplitude modulation section 223 adjusts the amplitude of the phase-shifted signal in correspondence with the signal amplitude of the original content. The phase correction circuit 224 detects the correction amount of the phase shift of the amplitude-adjusted signal and detects a watermark embedded in the content on the basis of the detected correction amount.

Detection of a phase shift correction amount will be described next in more detail with reference to FIG. 11. As shown in FIG. 11, when a content (input image) is processed by the spatial frequency filter (SFF) 221, a filtered content (filtered image) is obtained. By adding waveforms for the respective scanning cycles on the display screen, an accurate detection signal is obtained.

In the above-described case, a new watermark is rewritten in the recorder 20. However, the present invention is not limited to this. For example, a new watermark may be used as a mark to trace recording by the recorder 20. In this case, the new watermark need not be rewritten.

Processing of a once-copy content has been described above. However, the present invention is not limited to this. For example, the present invention can also be applied to a content for which copy is allowed a number of times.

In the above-described case, a new watermark is embedded in addition to an original watermark. Either a single or a plurality of new watermarks may be used. Even when a plurality of new watermarks are embedded, a rewritten content is displayed every time the original watermark is rewritten. Pieces of information related to the plurality of new watermarks are not displayed.

The content recording/reproducing apparatus shown in FIG. 1 can also protect the copyright of a content without copy restriction to a certain extent. When a content is to be copied by the content recording/reproducing apparatus shown in FIG. 1, a new watermark unique to the content recording/reproducing apparatus is embedded in the new content that has been copied (the content that has been copied once). When the new content (the content that has been copied once) is copied by the content recording/reproducing apparatus again, another new watermark unique to the content recording/reproducing apparatus is embedded in the new content that has been copied (the content that has been copied twice). Every time the content is copied, a new watermark unique to the content recording/reproducing apparatus is embedded in the content. Hence, the content gradually degrades. Since the content is degraded by repetitive copy, the copyright of the content without copy restriction can be protected to some degree.

The effects of the present invention will be summarized below.

(1) Every time a watermark (original watermark) contained in a content is rewritten, copy control information contained in the watermark (original watermark) is displayed. Since a general user can grasp the possibility of content copy or the possible number of times of copy, any trouble can be prevented.

(2) Original watermark embedding methods are standardized. For this reason, copy control information contained in an original watermark may be altered on the user side. On the other hand, a new watermark unique to a recorder makes not only the embedding method but also the presence of the new watermark itself secret. That is, when a new watermark unique to a recorder is embedded in a content independently of an original watermark, log management of the content becomes easy, and the copyright protecting function can be strengthened. For example, if copy control information contained in an original watermark does not match that contained in a new watermark unique to a recorder, it can be determined that the copy control information has been altered. In this way, when a new watermark unique to a recorder is embedded in a content, the capability of preventing illicit content copy can be greatly improved. The present invention can be applied not only to a case wherein a content is recorded on an optical disk but also to a case wherein a content is recorded on an HDD or magnetic tape.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for recording a content containing a watermark, comprising:

a detection section configured to detect a first watermark embedded in an original content by a first embedding method which is predefined in a standard;

a rewrite section configured to rewrite copy-allowable copy control information, which is contained in the first watermark and which allows copy to be made only once, into copy-prohibited copy control information, which prohibits copy to be made before recording;

a generation section configured to generate: (i) a second watermark containing copy-prohibited copy control information identical to copy-prohibited copy control information rewritten by the rewrite section; and (ii) a new second generation content containing the first watermark including rewritten copy-prohibited copy control information, and the second watermark including copy-prohibited copy control information identical to rewritten copy-prohibited copy control information, the second generation content being obtained by embedding the new second watermark in the original content using a second embedding method which is different from the first embedding method, which is not disclosed, and which is unique to the apparatus; and a recording section configured to record the second generation content.

2. An apparatus according to claim 1, further comprising a display section configured to display copy control information contained in the first watermark.

3. An apparatus according to claim 1, further comprising a display section configured to display the copy control information rewritten by said rewrite section.

4. A method of recording a content containing a watermark, comprising:

detecting a first watermark embedded in an original content by a first embedding method which is predefined in a standard;

rewriting copy-allowable copy control information, which is contained in the first watermark and which allows copy to be made only once, into copy-prohibited copy control information, which prohibits copy to be made before recording;

generating a second watermark containing copy-prohibited copy control information identical to rewritten copy-prohibited copy control information, and a second generation content including the first watermark containing rewritten copy-prohibited copy control information and the new second watermark including copy-prohibited copy control information identical to rewritten copy-prohibited copy control information, the second generation content being obtained by embedding the new second watermark in the original content using a second embedding method which is different from the first embedding method, which is not disclosed, and which is unique to the apparatus; and recording the new second generation content.

5. A method according to claim 4, wherein copy control information contained in the film watermark is displayed.

6. A method according to claim 4, wherein the rewritten copy control information is displayed.

* * * * *